(12) United States Patent
Sakamoto et al.

(10) Patent No.: US 8,339,536 B2
(45) Date of Patent: Dec. 25, 2012

(54) DISPLAY MODULE, DISPLAY-MODULE SUPPORT STRUCTURE AND LIQUID CRYSTAL DISPLAY APPARATUS

(75) Inventors: Michitaka Sakamoto, Yokohama (JP); Shigehiro Masuji, Yokohama (JP); Hidetoshi Ishibashi, Yokohama (JP); Takenori Yaguchi, Yokohama (JP)

(73) Assignee: JVC Kenwood Corporation, Kanagawa (JP)

( * ) Notice: Subject to any disclaimer, the term of this patent is extended or adjusted under 35 U.S.C. 154(b) by 326 days.

(21) Appl. No.: 12/660,162

(22) Filed: Feb. 22, 2010

(65) Prior Publication Data
US 2010/0220257 A1  Sep. 2, 2010

(30) Foreign Application Priority Data
Feb. 27, 2009  (JP) .................................. 2009-46013

(51) Int. Cl.
*G02F 1/1333* (2006.01)
(52) U.S. Cl. ................. 349/58; 349/56; 349/59; 349/60
(58) Field of Classification Search .................... 349/56, 349/58, 59, 60
See application file for complete search history.

(56) References Cited

U.S. PATENT DOCUMENTS

| 7,006,168 B2 * | 2/2006 | Lee ................................. 349/58 |
| 2004/0041961 A1 | 3/2004 | Lee ................................. 349/58 |
| 2005/0212982 A1 | 9/2005 | Soga ............................. 348/825 |
| 2007/0126946 A1 * | 6/2007 | Tae et al. ......................... 349/58 |
| 2011/0080698 A1 * | 4/2011 | Furuta et al. ............. 361/679.01 |

FOREIGN PATENT DOCUMENTS

| JP | 2006-235425 | 9/2006 |
| JP | 2008-096851 | 4/2008 |

OTHER PUBLICATIONS

European Search Report (2 pages—dated May 4, 2010).

* cited by examiner

*Primary Examiner* — Jennifer Doan
(74) *Attorney, Agent, or Firm* — Renner, Kenner, Greive, Bobak, Taylor & Weber

(57) ABSTRACT

A display module is equipped with a display panel having a display screen for displaying images on a front side of the panel. A panel chassis is provided on a rear side of the display panel with respect to the display screen. The display module is assembled with a plurality of fixing members. Each fixing member has a panel holder to hold the display panel as covering a portion of a periphery of the display screen and a chassis coupling member coupled to the panel chassis so that the display panel is interposed between the panel holder and the panel chassis.

7 Claims, 11 Drawing Sheets

DISPLAY MODULE, DISPLAY-MODULE SUPPORT STRUCTURE AND LIQUID CRYSTAL DISPLAY APPARATUS

CROSS-REFERENCE TO RELATED APPLICATIONS

This application is based on and claims the benefit of priority from the prior Japanese Patent Application No. 2009-046013 filed on Feb. 27, 2009, the entire contents of which is incorporated herein by reference.

BACKGROUND OF THE INVENTION

The present invention relates to a display module, a support structure for the display module and a display apparatus, having a thin and lightweight display panel.

Display apparatuses rapidly becoming popular in recent years are display apparatuses or television apparatuses to display images with a display module having a liquid crystal display panel.

Such display apparatuses usually consist of: a display panel unit including a cabinet having a display module and a display screen installed therein as viewable from outside; and a mount by which the display panel unit is supported as swingable.

A display module having a liquid crystal display panel requires a backlight device having a light source with light-emitting diodes or a tube-type light source, such as, a cold cathode fluorescent lamp (CCFL) and an external electrode fluorescent lamp (EEFL).

In such image display apparatuses, a liquid crystal display panel of a display module is supported by frame members attached to the periphery of a display screen on the front and rear sides of the panel so that the panel is interposed between the frame members. The frame members are usually made of a metallic or resin material called a bezel or a panel frame (a panel chassis). Such a panel supporting mechanism is disclosed in Japanese Un-examined Patent Publication No. 2008-96851 (referred to as Document 1, hereinafter).

Recently, there is a strong demand for a thin and lightweight display panel unit for display apparatuses with a large display screen. Such a thin and lightweight display panel unit requires a thin and lightweight display module having a high volume and mass ratio in a display apparatus.

For such a thin and lightweight display module, Japanese Un-examined Patent Publication No. 2006-235425 (referred to as Document 2, hereinafter) discloses a structure in which a liquid crystal display panel is directly interposed between a cabinet and a panel frame without a bezel.

Such a display panel support structure disclosed in Documents 1 and 2 requires buffer members between a liquid crystal display panel and a cabinet or bezels provided on the front and rear sides of the panel to support the panel, or between a liquid crystal display panel and a panel frame or a panel chassis provided behind the panel to support the panel.

These buffer members prevent a liquid crystal display panel from being shifted from the original position or damaged due to external shock or vibration, and also block alien substances such as dust from entering a backlight device provided behind the panel.

However, such a display panel support structure with no bezels provided (referred to as a bezel-less structure, hereinafter) disclosed in Document 2 could cause problems when applied for achieving a thin and lightweight display module.

Removal of a cabinet from a display apparatus having the bezel-less structure in the maintenance operations could damage a liquid crystal display panel because of the bezel-less structure in which the panel is not connected to a backlight device. Another problem is that alien substances could enter the backlight device provided behind the panel.

The display panel support structure disclosed in Document 1 could also cause problems of reduction in overall strength and stiffness of a display apparatus because of a lightweight bezel or panel frame for achieving a thin and lightweight display module.

Particularly, the bezel-less structure causes problems of reduction in overall strength and stiffness of a display module due to warpage caused by temperature change, which leads to internal deformation, in addition to external shock or vibration.

SUMMARY OF THE INVENTION

A purpose of the present invention is to provide a display module, a support structure for the display module and a display apparatus, having a thin and lightweight display module, protected from alien substances such as dust from entering a backlight device and damages to a liquid crystal display panel during maintenance operations.

The present invention provides a display module comprising a display panel having a display screen for displaying images on a front side of the panel; a panel chassis provided on a rear side of the display panel with respect to the display screen; and a plurality of fixing members each having a panel holder to hold the display panel as covering a portion of a periphery of the display screen and a chassis coupling member coupled to the panel chassis so that the display panel is interposed between the panel holder and the panel chassis.

Moreover, the present invention provides a display-module support structure comprising: a display panel having a display screen for displaying images on a front side of the panel; a panel chassis provided on a rear side of the display panel with respect to the display screen; a plurality of fixing members each having a panel holder to hold the display panel as covering a portion of a periphery of the display screen and a chassis coupling member coupled to the panel chassis so that the display panel is interposed between the panel holder and the panel chassis, thus constituting a display module; a front cover having an opening through which a portion of the display screen is exposed to the front side; and a plurality of buffer members provided on an periphery of the opening of the front cover as facing with the display module and as not interfering with the panel holder of each fixing member.

Furthermore, the present invention provides a display apparatus comprising: a display panel having a display screen for displaying images on a front side of the panel; a panel chassis provided on a rear side of the display panel with respect to the display screen; a plurality of fixing members each having a panel holder to hold the display panel as covering a portion of a periphery of the display screen and a chassis coupling member coupled to the panel chassis so that the display panel is interposed between the panel holder and the panel chassis, thus constituting a display module; a front cover having an opening through which a portion of the display screen is exposed to the front side; a rear cover to cover the display module on a rear side of the display panel, the display module being interposed between the front and rear covers; and a plurality of buffer members provided on an periphery of the opening of the cabinet as facing with the display module and as not interfering with the panel holder of each fixing member.

DETAILED DESCRIPTION OF PREFERRED EMBODIMENT

A preferred embodiment of the present invention will be described with respect to FIGS. 1 to 11.

Figure 1:
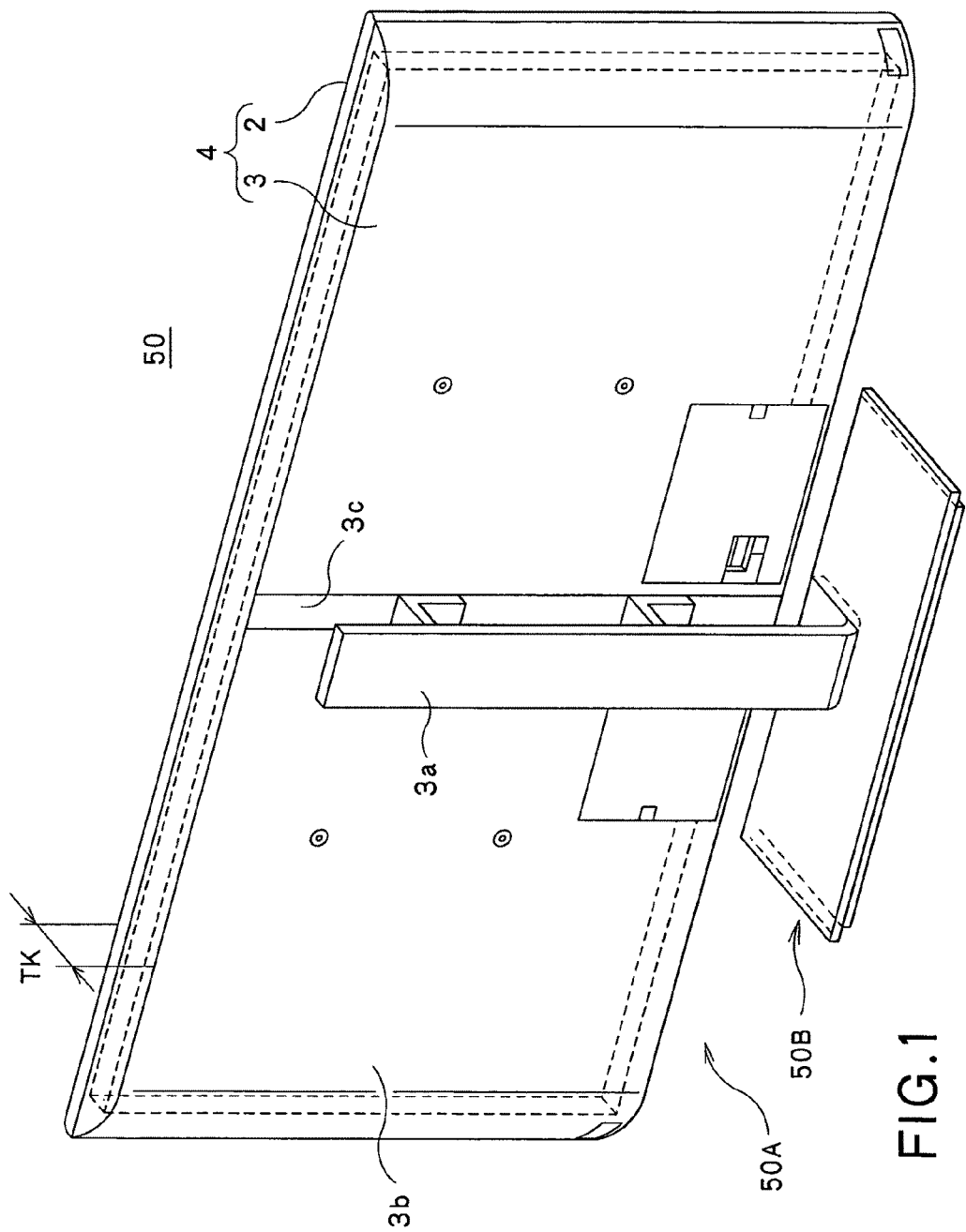
FIG. 1 is an external perspective view of a display apparatus according to the present invention, viewed from rear and diagonally upward.
Figure 2:
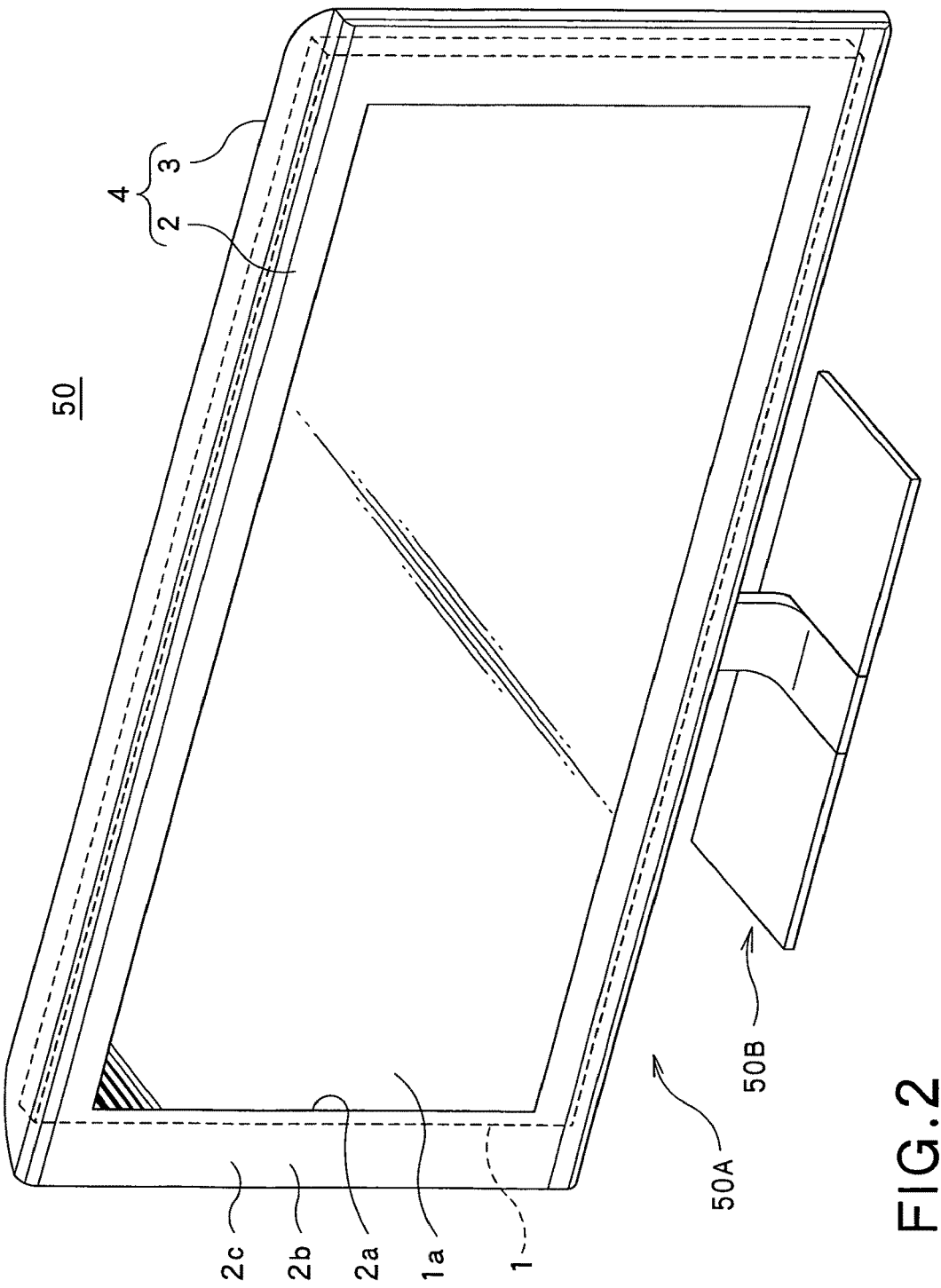
FIG. 2 is a perspective view of the display apparatus according to the present invention, viewed from front and diagonally upward.

FIG. 1 shows an external perspective view of a display apparatus 50 according to the present invention, viewed from rear and diagonally upward. FIG. 2 shows the display apparatus 50, viewed from front and diagonally upward.

The display apparatus 50 shown in FIGS. 1 and 2 is a 42-inch television equipped with a liquid crystal display module 1 (referred to as the display module 1, hereinafter), in this embodiment, that consists of: a display panel 50A having the display module 1 installed therein; and a mount 50B to support the panel 50A so that the panel 50A can be turned in the perpendicular and lateral directions.

The display panel 50A has a cabinet 4 with a front cover 2 that is a frame member and a rear cover 3 that is a flat box with an opening on one side. Installed in the cabinet 4 are the display module 1 held by a support structure which will be described later, a circuit board for television signal processing, a power supply, etc., (not shown).

As shown in FIG. 1, an L-shaped fixing member 3a is attached to the mount 50B. The fixing member 3a is also attached to a center pillar 3c of the display panel 50A, with a fixing member (not shown). The panel 50A is supported by the mount 50B with the pillar 3c and the fixing member 3a.

The front cover 2 has an opening 2a through which a display screen 1a of the display module 1 is exposed, as shown in FIG. 2. The frame section that surrounds the opening 2a is referred to as an edge section 2c. The front-side plane of the front cover 2 is referred to as a reference front plane 2b, hereinafter.

In relation to the reference front plane 2b, the zone except for the center pillar 3c, in the rear cover 3 shown in FIG. 1, is referred to as a reference rear plane 3b, hereinafter.

The thickness of the display panel 50A except for the center pillar 3c is referred to as a thickness TK that corresponds to the distance between the reference front and rear planes 2b and 3b. A smaller thickness TK contributes to a thinner display panel 50A.

Figure 3:
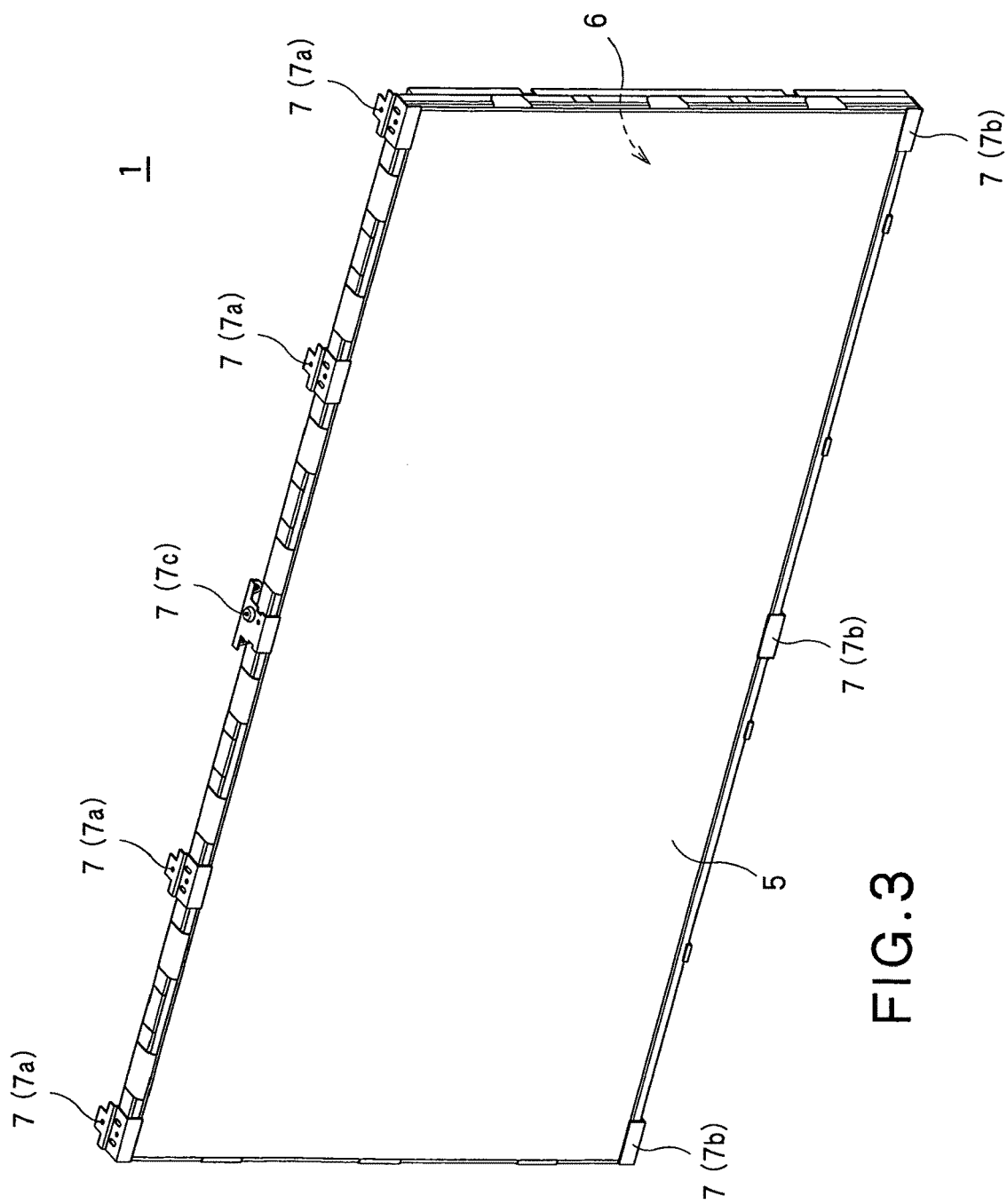
FIG. 3 is a perspective view of a display module installed in the display apparatus according to the present invention.

FIG. 3 shows a perspective view of the display module 1. The module 1 is constituted by a flat rectangular liquid crystal display panel 5 (referred to as the display panel 5, hereinafter) and a flat rectangular backlight device 6 provided behind the panel 5, both being united with each other with several fixing members 7 which will be described later in detail, with five at the upper module edge and three at the lower module edge.

Figure 4:
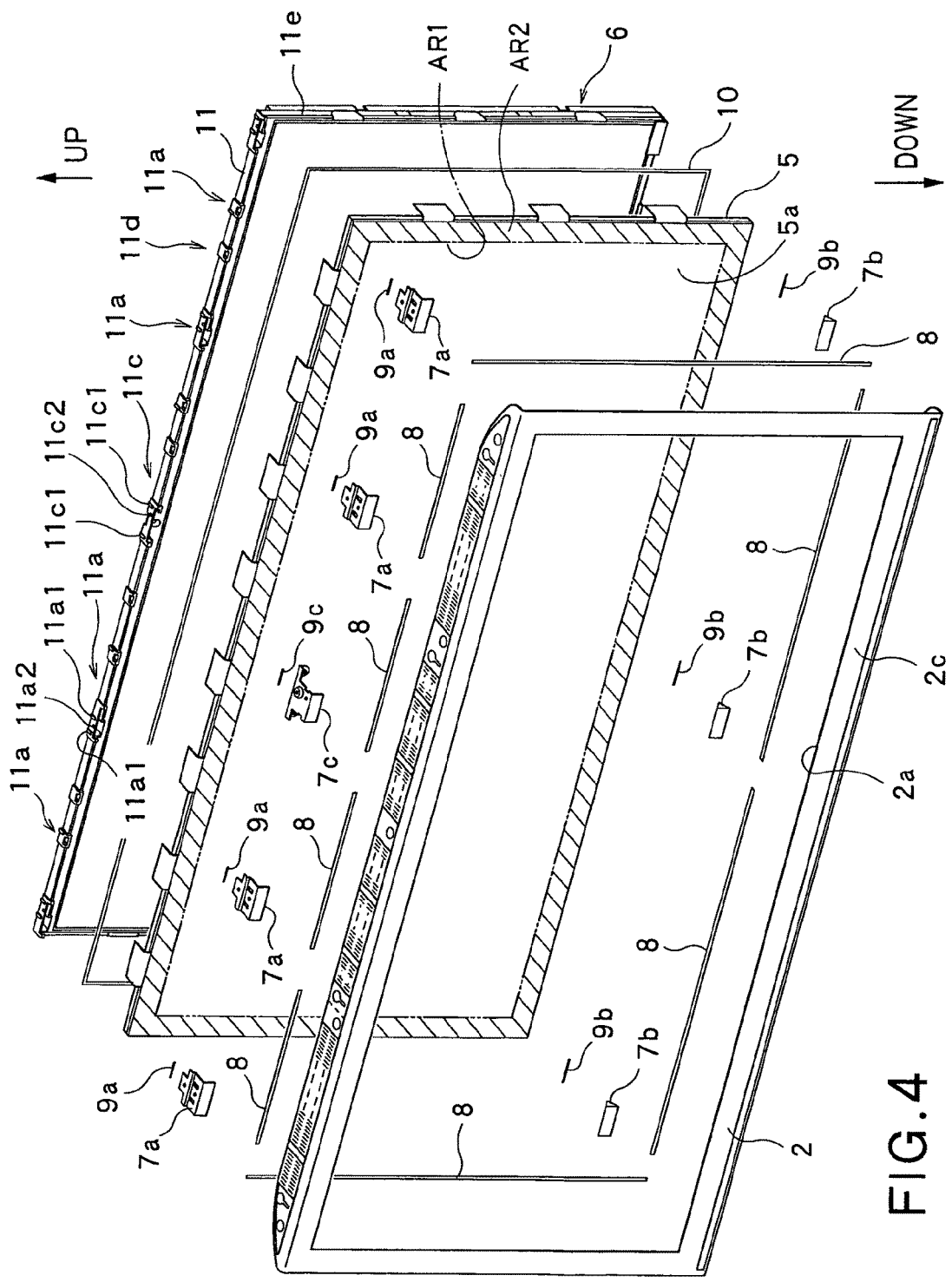
FIG. 4 is a diagrammatic perspective view illustrating a support structure for the display module of FIG. 3 to be attached to a front cover of the display apparatus according to the present invention.

FIG. 4 shows a diagrammatic perspective view illustrating a support structure for the display module 1 to be attached to the front cover 2.

The display panel 5 and the backlight device 6 are united with each other to constitute the display module 1, with a frame buffer member 10 interposed between the panel 5 and the device 6 and the fixing members 7 to fix the panel 5 and the device 6 together with the buffer member 10 therebetween.

There are three types of fixing members 7 having different configurations which will be described later in detail, to unite the display panel 5 and the backlight device 6 with each other. The three types are: an upper center fixing member 7c attached to the side face of the upper edge center of the display module 1; upper fixing members 7a, a pair attached to the side face of the upper edge of the module 1, on both sides of the member 7c; and three lower fixing members 7b attached to the side face of the lower edge of the module 1.

The side face of the upper edge of the display module 1 corresponds to the side face of the upper edge of the front cover 2 shown in FIG. 7, including an upper section TD1 (indicated by a dashed dotted line), which will be described later.

The display module 1 is attached to the front cover 2 from behind the cover 2 with the fixing members 7 described above. The frame buffer member 10 is not an essential member when the module 1 is attached to the front cover 2.

Several buffer members 8 are previously provided on the rear side of the front cover 2 at positions corresponding to an outer zone AR2 (indicated by oblique lines in FIG. 4) that surrounds a display zone AR1 of a display screen 5a of the display panel 5.

The buffer members 8 are attached to the front cover 2 on the rear side thereof so that the buffer members 8 have almost no gaps with the fixing members 7 (7a, 7b and 7c) but do not interfere with the members 7 in the outer zone AR2 when the display panel 5 is attached.

Buffer members 9a, 9b, and 9c are attached to the upper fixing members 7a, the lower fixing members 7b, and the upper center fixing member 7c, respectively, as provided between the members 7 and the display panel 5.

The display module 1 is attached to the front cover 2 with the buffer members 8 interposed therebetween, so that the members 8 effectively absorb external shock or vibration to be applied to the display panel 5. Moreover, the buffer members 8 block alien substances such as dust from entering the backlight device 6 located behind the panel 5, from the opening 2a of the front cover 2.

The backlight device 6 has a flat box-like panel chassis 11 that is constituted by a flat rear panel section 11d and a surrounding wall section lie that stands on the panel section 11d.

Although it is an option, when the buffer member 10 is installed between the display panel 5 and the backlight device 6, it is placed on the flat rear panel section 11d as surrounded by the wall section lie of the panel chassis 11 so that it is interposed between the chassis 11 and the panel 5.

The fixing members 7 (7a, 7b and 7c) are fixed to the panel chassis 11 with male screws (not shown) on the upper and lower sides and also to the front cover 2 with male screws (not shown) from behind the cover 2.

As disclosed above, the display panel 5 and the backlight device 6 are united with each other with the fixing members 7 that are very small and lightweight, compared to the well-known bezel that is provided as surrounding a display module for uniting a display panel and a backlight device, thus achieving reduction in volume and mass of the display module 1.

Moreover, different from the known bezel-less structure, the display panel 5 and the backlight device 6 are firmly united with each other with the fixing members 7, thus the panel 5 has a lower risk of being damaged when the cabinet 4 is removed during maintenance operations, with a lower risk of allowing alien substances such as dust to enter the device 6 located behind the panel 5.

Moreover, since the display panel 5 and the backlight device 6 are united with each other, the panel 5 itself contributes to a higher strength of the device 6, even if the frame members such as the buffer member 10 is made of a lightweight material; which achieves a highly-strengthened united structure against external shock or vibration and also a highly-strengthened and -stiffened display module 1 against warpage and internal deformation due to temperature change.

Described below are essential members used in this embodiment of the present invention, such as the fixing members 7 (7a, 7b and 7c).

Figure 5:
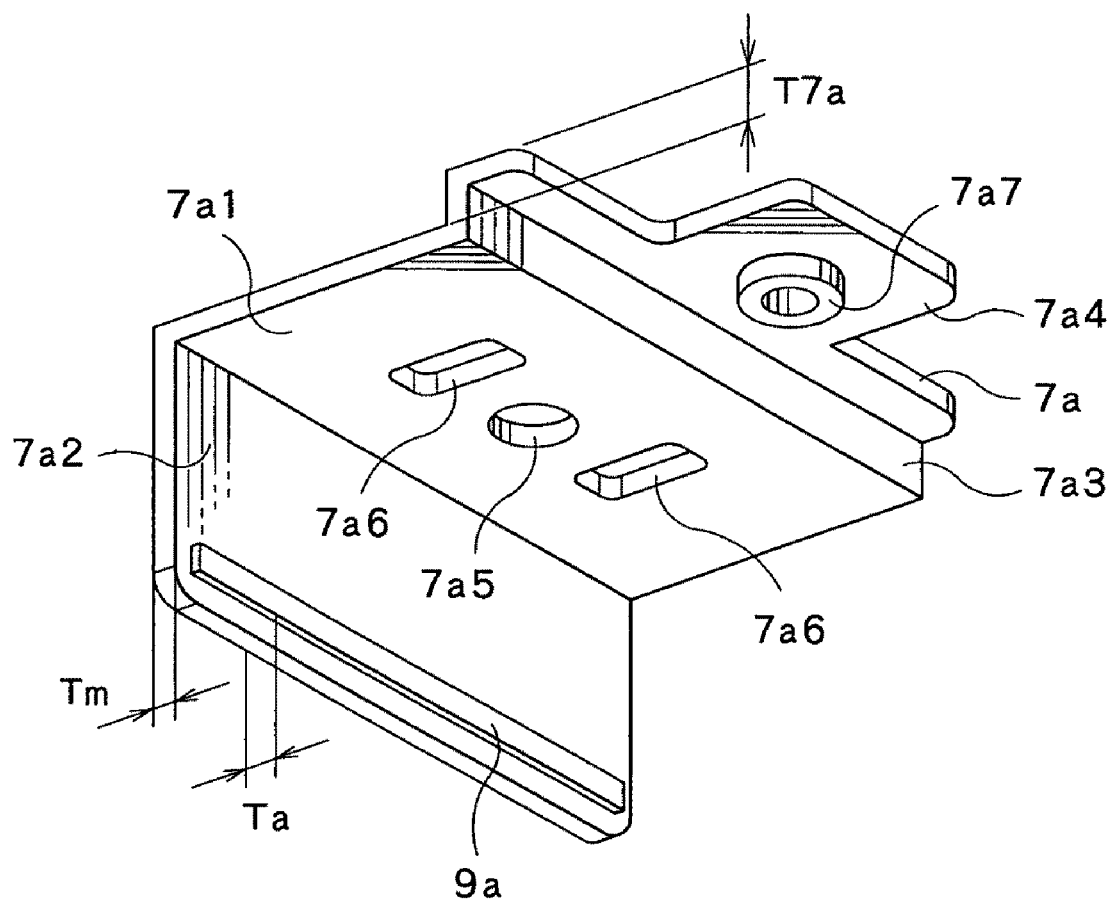
FIG. 5 is a perspective view of each of several upper fixing members used in assembly of the display apparatus according to the present invention.

Shown in FIG. 5 is a perspective view of each upper fixing member 7a of FIG. 3.

The upper fixing member 7a is made of a pressed sheet metal, having: a rectangular chassis coupling member 7a1; a panel holding member 7a2 bent at about 90 degrees from one of the longer sides of the member 7a1; a stepped member 7a3 with a two-stepped portion connected to the other longer side of the member 7a1; and a front-cover holder 7a4 connected to the member 7a3, formed as parallel with the member 7a1.

The panel holding member 7a2 is attached with a buffer member 9a at its folded inner surface that is to be contacted with the display panel 5 in assembly. The buffer member 9a is attached to the holding member 7a2 so that, in FIG. 4, the upper fixing member 7a comes in contact with the outer zone AR2 without entering the display zone AR1 when it is attached to the panel chassis 11. When the fixing member 7a is attached to the chassis 11, the buffer member 9a comes in contact with the display panel 5 to hold the panel 5.

A thickness Ta shown in FIG. 5 is the total of a thickness Tm of the upper fixing member 7a and that of the buffer member 9a.

Provided on the chassis coupling member 7a1 are a through hole 7a5 at the center and a pair of long holes 7a6 on both sides of the hole 7a5.

Figure 9:
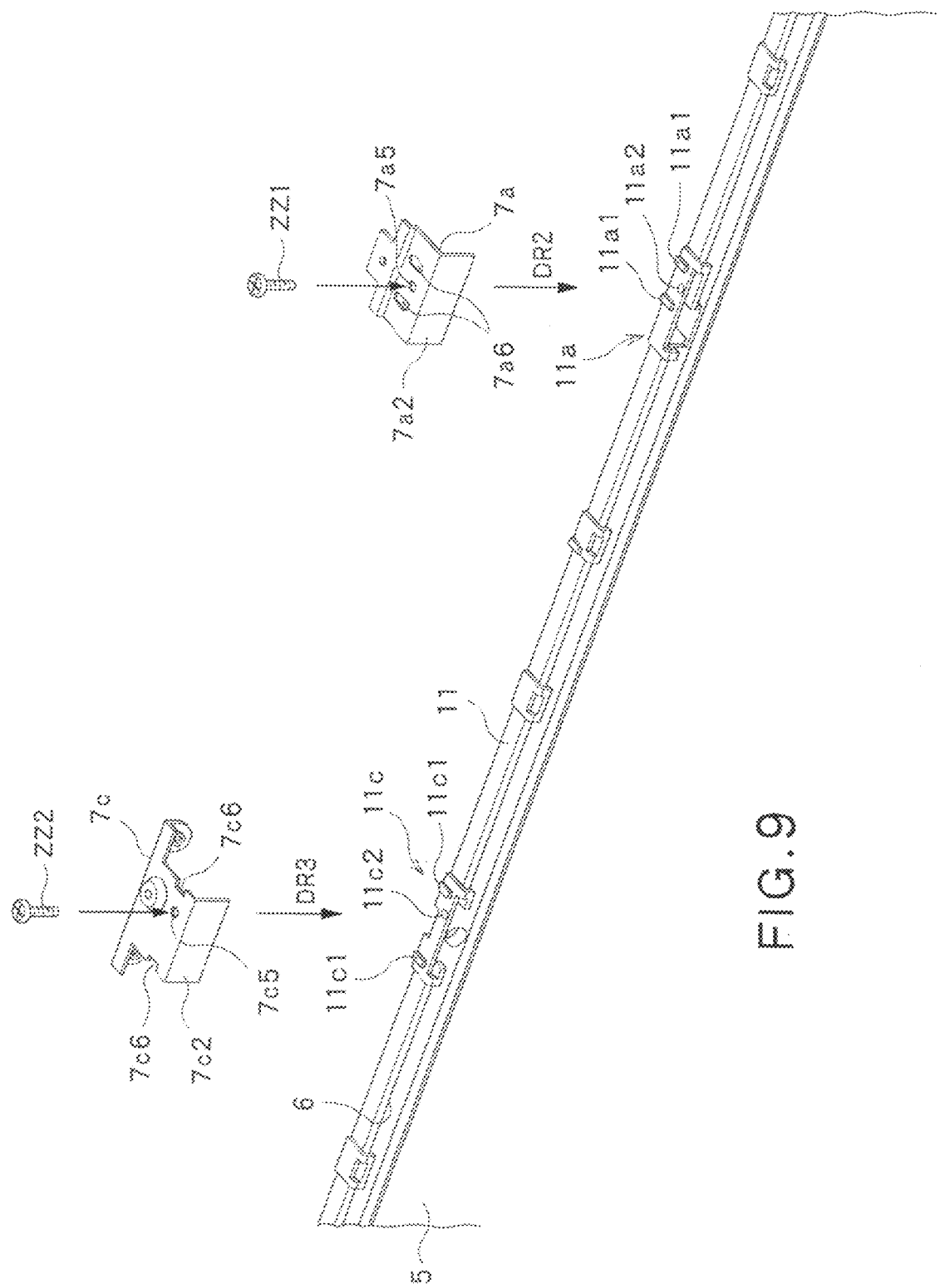
FIG. 9 is an illustration showing fixing members being attached to a panel chassis in assembly of the display apparatus according to the present invention.

Although it will be described later in detail, a pair of protrusions 11a1 are provided on the panel chassis 11, as shown in FIG. 9, which will be described later in detail. The long holes 7a6 of each upper fixing member 7a are engaged with the protrusions 11a1 so that the member 7a is positioned on the chassis 11 at a predetermined location.

Also provided on the panel chassis 11 in between the protrusions 11a1 is a female screw 11a2, as shown in FIG. 9, which will be described later in detail. After the long holes 7a6 of the upper fixing member 7a are engaged with the protrusions 11a1, a male screw zz1 is screwed into the female screw 11a2 via the through hole 7a5 (FIG. 5) to fix the member 7a to the chassis 11, to unite the display panel 5 and the backlight device 6 with each other.

When the display panel 5 and the backlight device 6 are united with each other, the panel 5 is interposed between the panel holding member 7a2 (FIG. 5) of each upper fixing member 7a and the panel chassis 11 with the buffer member 9a therebetween which may be pressed in some degree. The buffer member 10 may also be pressed in some degree when it is provided, as shown in FIG. 4.

In each upper fixing member 7a, shown in FIG. 5, a height T7a of the stepped member 7a3 is adjusted as higher than the screw head of the male screw zz1 to be screwed into the female screw 11a2 (FIG. 9) via the through hole 7a5, so that the screw head does not stick out from the cabinet 4, or the front cover 2 (FIGS. 2 and 4).

Figure 8:
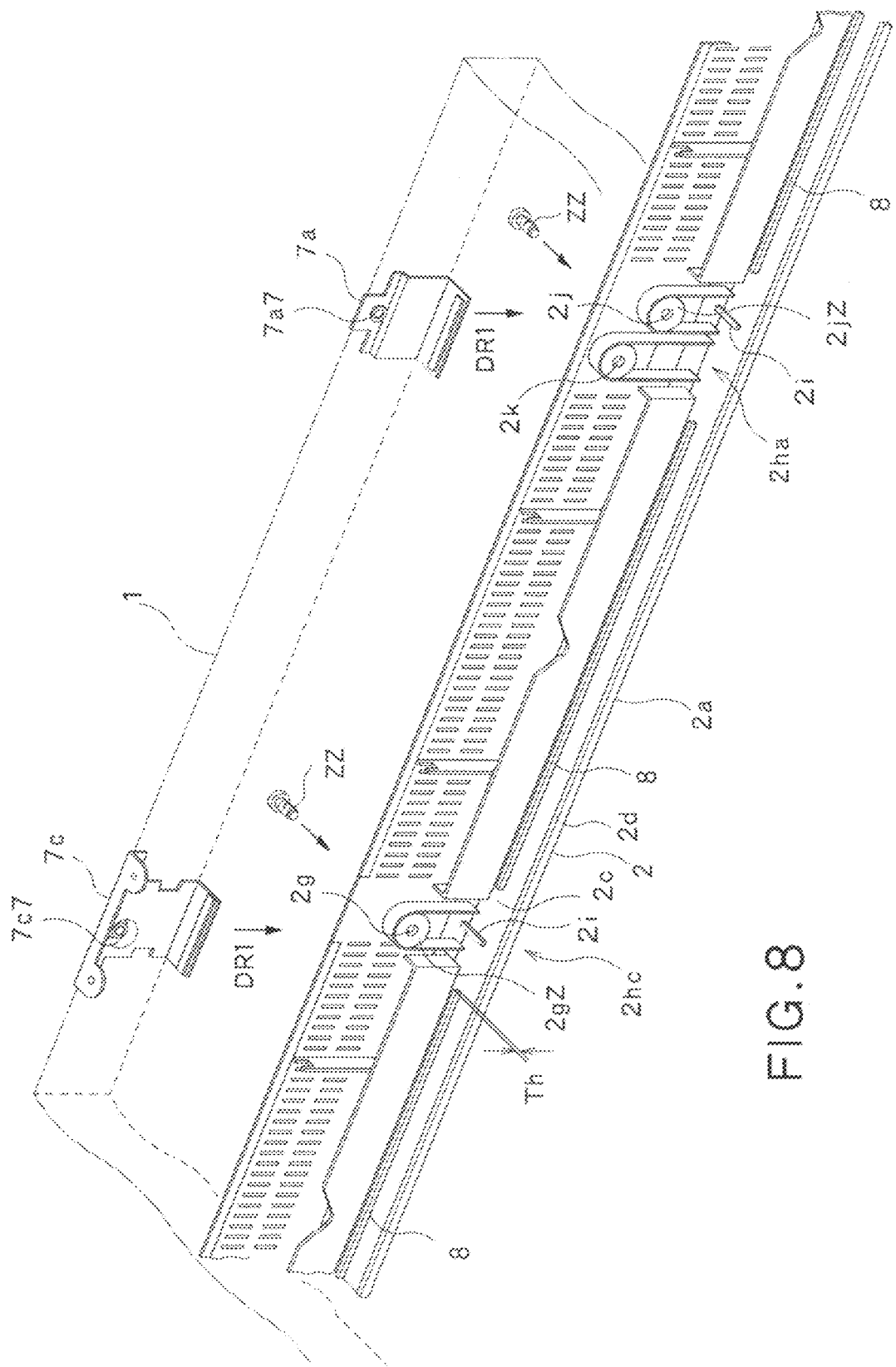
FIG. 8 is an enlarged perspective view of an upper section DT1 (a zone indicated by a dashed dotted line) of the front cover viewed in a direction Y1 as shown in FIG. 7, with a fragment of the display module installed in the display apparatus according to the present invention, indicated with a double-dashed dotted line.

Moreover, as shown in FIG. 5, a female screw 7a7 is formed by buring on the center of the front-cover holder 7a4. Provided in the inner surface of the front cover 2 is a mount member 2jz (FIG. 8) at a location corresponding to the holder 7a4 for the display module 1 to be attached to the cover 2. The member 2jz has a through hole 2j, as shown in FIG. 8, which will be described later in detail, at a location corresponding to the female screw 7a7. A male screw zz is screwed into the female screw 7a7 via the through hole 2j to fix the upper fixing member 7a to the front cover 2, to attach the display module 1 to the cover 2.

Figure 6:
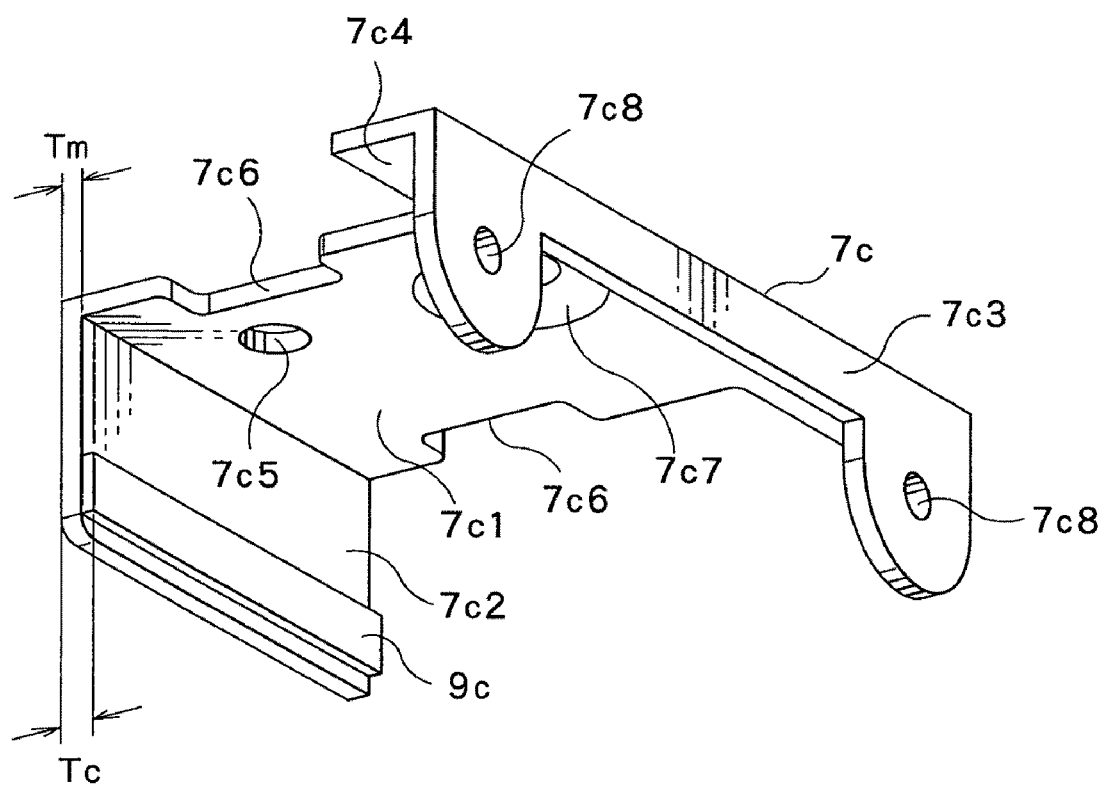
FIG. 6 is a perspective view of an upper center fixing member used in assembly of the display apparatus according to the present invention.

Shown in FIG. 6 is a perspective view of the upper center fixing member 7c shown in FIG. 3.

The upper center fixing member 7c is made of a pressed sheet metal, having: a rectangular chassis coupling member 7c1; a panel holding member 7c2 bent at about 90 degrees from one of the longer sides of the member 7c1; a front-cover holder 7c4 connected to the other side of the member 7c1; and a rear-cover holder 7c3 connected to the holder 7c4 and bent in the same direction as the member 7c2. The holder 7c4 is formed as extending from the member 7c1 in the same plane.

The panel holding member 7c2 is attached with a buffer member 9c at its folded inner surface that is to be in contact with the display panel 5. The buffer member 9c is attached to the holding member 7c2 so that, in FIG. 4, the upper center fixing member 7c comes in contact with the outer zone AR2 without entering the display zone AR1 when it is attached to the panel chassis 11. When the fixing member 7c is attached to the chassis 11, the buffer member 9c comes in contact with the display panel 5 to hold the panel 5.

A thickness Tc shown in FIG. 6 is the total of a thickness Tm of the upper center fixing member 7c and that of the buffer member 9c.

Provided on the chassis coupling member 7c1 are a through hole 7c5 and a pair of cutout sections 7c6 on both sides of the hole 7c5, one of the sections 7c6 being formed as closer to the hole 7c5.

Although it will be described later in detail, a pair of protrusions 11c1 are provided on the panel chassis 11, as shown in FIG. 9. The cutout sections 7c6 of the upper center fixing member 7c are engaged with the protrusions 11c1 so that the member 7c is positioned on the chassis 11 at a predetermined location, which will be described later in detail.

Also provided on the panel chassis 11 in between the protrusions 11c1 is a female screw 11c2, as shown in FIG. 9, which will be described later in detail. After the cutout sections 7c6 of the upper center fixing member 7c are engaged with the protrusions 11c1, the male screw zz2 is screwed into the female screw 11c2 via the through hole 7c5 (FIG. 6) to fix the member 7c to the chassis 11, to unite the display panel 5 and the backlight device 6 with each other.

When the display panel 5 and the backlight device 6 are united with each other, the panel 5 is interposed between the panel holding member 7c2 (FIG. 6) of the upper center fixing member 7c and the panel chassis 11 with the buffer member 9c therebetween which may be pressed in some degree. The buffer member 10 may also be pressed in some degree when it is provided, as shown in FIG. 4.

Moreover, as shown in FIG. 6, a female screw 7c7 is formed by buring on the front-cover holder 7c4. Provided in the inner surface of the front cover 2 is a mount member 2gz (FIG. 8) at a location corresponding to the holder 7c4 for the display module 1 to be attached to the cover 2. The member 2gz has a through hole 2g, as shown in FIG. 8, which will be described later in detail, at a location corresponding to the female screw 7c7. A male screw zz is screwed into the female screw 7c7 via the through hole 2g to fix the upper center fixing member 7c to the front cover 2, to attach the display module 1 to the cover 2.

The height of the female screw 7c7 formed on the front-cover holder 7c4 by buring is adjusted as higher than the screw head of a male screw zz2 to be inserted into the through hole 7c5, as will be explained later with reference to FIG. 9, so that the screw head does not stick out from the cabinet 4 or the front cover 2.

Furthermore, as shown in FIG. 6, the rear-cover holder 7c3 is provided with a pair of female screws 7c8 on both sides of the outer surface of the holder 7c3 with which the center pillar 3c (FIG. 1) is contact when the display panel 50A is assembled. Although not shown in FIG. 1, the pillar 3c is provided with a pair of through holes at locations corresponding to the female screws 7c8. Male screws (not shown) are is screwed into the female screws 7c8 via the through holes to fix the upper center fixing member 7c to the pillar 3c, thus the display panel 50A is mounted on or supported by the mount 50B with the L-shaped fixing member 3a.

Figure 7:
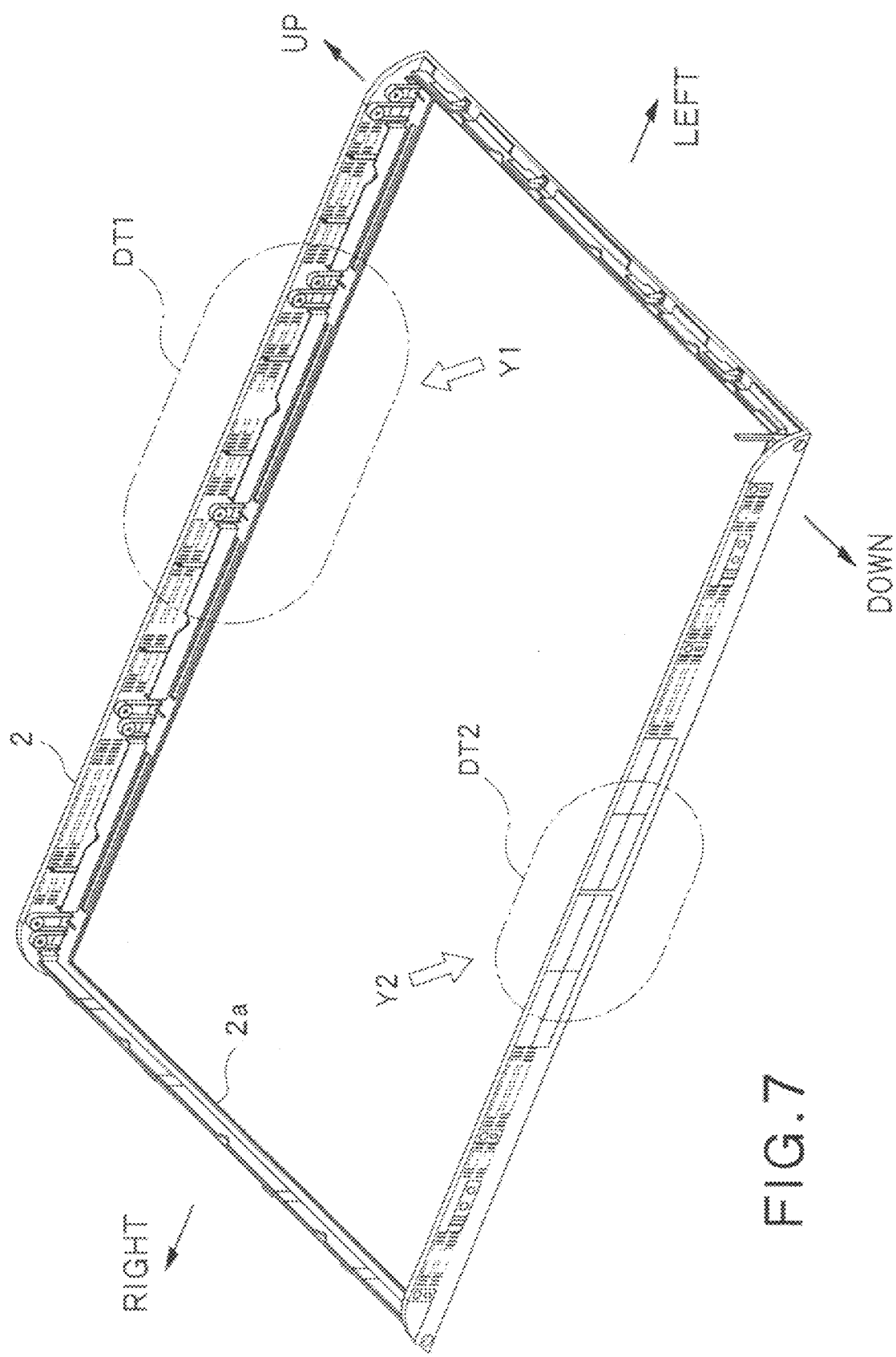
FIG. 7 is a perspective view of the front cover of the display apparatus according to the present invention, viewed from rear and diagonally downward, indicated with directions UP, DOWN, RIGHT and LEFT, viewed from front when in use.

The front cover 2 is described in detail with respect to FIGS. 7 and 8. FIG. 7 is a perspective view of the cover 2, viewed from rear and diagonally downward, indicated with directions UP, DOWN, RIGHT and LEFT, viewed from front when in use. FIG. 8 is an enlarged perspective view of the upper section DT1 (a zone indicated by a dashed dotted line) of the cover 2 viewed in a direction Y1 as shown in FIG. 7, with a fragment of the display module 1 attached with the upper fixing members 7a and 7c, indicated with a double-dashed dotted line, for easier understanding of assembly.

Attached to the inner surface of a stepped section 2d of the opening 2a, in FIG. 8, are the buffer members 8 (FIG. 4) that are provided at specific locations so that they do not interfere with the upper fixing members 7a, the lower fixing members 7b, and the upper center fixing member 7c. The buffer members 8 are pressed so that the display module 1 and the front cover 2 have almost no gaps therebetween when the module 1 is attached to the cover 2.

The stepped section 2d is provided at the edge of the opening 2a, like a rib, sticking out in the same direction as the buffer members 8. The stepped section 2d protects the display module 1 from alien substances such as dust. Moreover, the stepped section 2d makes the front cover 2 strong and rigid so as not to be easily damaged. The stepped section 2d has a height so as not to touch the module 1.

The upper fixing members 7a and the upper center fixing member 7c attached to the display module 1 are attached to the front cover 2 in a direction DR1 as indicated in FIG. 8. More in detail, the fixing members 7a and 7c are attached to the front cover 2 at holder sections 2ha and 2hc, respectively, having configurations to receive the members 7a and 7c, respectively.

Each of the holder sections 2ha and 2hc has a protrusion 2i laid in a front-rear direction (thickness). The upper fixing members 7a and the upper center fixing member 7c come in contact with the corresponding protrusions 2i in positioning of the display module 1 in the front-rear direction.

The upper fixing members 7a and the upper center fixing member 7c are attached to the front cover 2 with the male screws zz that are screwed into the female screws 7a7 and 7c7 (shown in FIGS. 5 and 6, respectively) via the through holes 2j and 2g, respectively.

The front cover 2 is provided further with a through hole 2k near each holder section 2ha, as shown in FIG. 8. A male screw (not shown) is screwed into a female screw (not shown) of the rear cover 3 via the through hole 2k so that the covers 2 and 3 are fixed to each other.

The buffer members 8 provided in the zones of the inner surface of the stepped section 2d, where the upper fixing members 7a and the upper center fixing member 7c are not provided, have a thickness Th different from that of the buffer members 9a and 9c attached to the fixing members 7a and 7c, respectively. The thickness Th is equal to the thicknesses Ta and Tc shown in FIGS. 5 and 6, respectively. The thickness Ta is the total thickness of each upper fixing member 7a and the buffer member 9a. The thickness Tc is the total thickness of the upper center fixing member 7c and the buffer member 9c.

The fixing members 7 are attached to the front cover 2 or the rear cover 3 (frame member) at the upper and lower zones that surround the display screen 1a, as shown in FIGS. 2 and 4.

As disclosed above, the display panel 5 and the backlight device 6 are untied with each other with several small pieces of fixing members such as the upper fixing members 7a, the lower fixing members 7b, and the upper center fixing member 7c, in this embodiment.

The embodiment employing such small pieces of fixing members, different from the known frame members such as the bezel that is attached to the outer edge of a display panel to surround a display screen, achieves a thin and lightweight display apparatus.

The display apparatus 50 in the embodiment equipped with such small pieces of fixing members allows easy maintenance operations, with lower risk of entrance of alien substances such as dust into the backlight device and damages to the display panel.

Higher rigidity is given to the display apparatus 50 with optional reinforcing sheet-metal members to the panel chassis 11 of the backlight device 6 (FIG. 4). The center pillar 3c (FIG. 1) to which the upper center fixing member 7c is attached is one example of such reinforcing sheet-metal member.

With such small pieces of fixing members (not the known frame members) and optional reinforcing sheet-metal members, the embodiment achieves a thin and lightweight display apparatus with higher rigidity.

Shown in FIG. 9 is that the fixing members 7a and 7c are attached to the panel chassis 11 with the male screws zz1 and zz2 to unite the display panel 5 and the backlight device 6 with each other.

Provided on the panel chassis 11 are mount members 11a and 11c having the protrusions 11a1 and 11c1, respectively, and the female screws 11a2 and 11c2, respectively. Provided in the embodiment are one mount member 11c and two mount members 11a on both sides of the mount member 11c, as shown in FIG. 4.

In FIG. 9, the upper fixing member 7a is attached to the mount member 11a in a direction DR2 so that the long holes 7a6 (FIG. 5) are engaged with the protrusions 11a1 and the panel holding member 7a2 (FIG. 5) is in contact with the display panel 5.

The long holes 7a6 of the upper fixing member 7a are formed larger than the protrusions 11a1 of the mount member 11a in the front-rear (thickness) direction so that the member 7a can be positioned on the panel chassis 11 with no damages to the display panel 5.

After the upper fixing member 7a is positioned, the male screw zz1 is screwed into the female screws 11a2 of the mount member 11a via the through hole 7a5 so that the member 7a is attached to the panel chassis 11 to unite the display panel 5 and the backlight device 6 with each other.

The assembly with the upper fixing members 7a can set out the position of the display panel 5 and the backlight device 6 in the front-rear (thickness) direction and also the up-down (height) direction.

Moreover, in FIG. 9, the upper center fixing member 7c is attached to the mount member 11c in a direction DR3 so that the cutout sections 7c6 (FIG. 6) are engaged with the protrusions 11c1 so that the member 7c is positioned on the panel chassis 11.

After the upper center fixing member 7c is positioned, the male screw zz2 is screwed into the female screws 11c2 of the mount member 11c via the through hole 7c5 so that the member 7c is attached to the panel chassis 11 to unite the display panel 5 and the backlight device 6 with each other.

In this embodiment, the fixing members 7a and 7c are provided with the long holes 7a (FIG. 5) and the cutout sections 7c6 (FIG. 6), respectively. However, the members 7a and 7c may be provided with either of such long holes or cutout sections for positioning. For example, the members 7a and/or 7c may be provided with the long holes in the case where the members 7a and/or 7c are formed as having a relatively small width in the direction of the buffer members 9a (FIG. 5) and 9c (FIG. 6) whereas the cutout sections if the width is relatively large.

Figure 10:
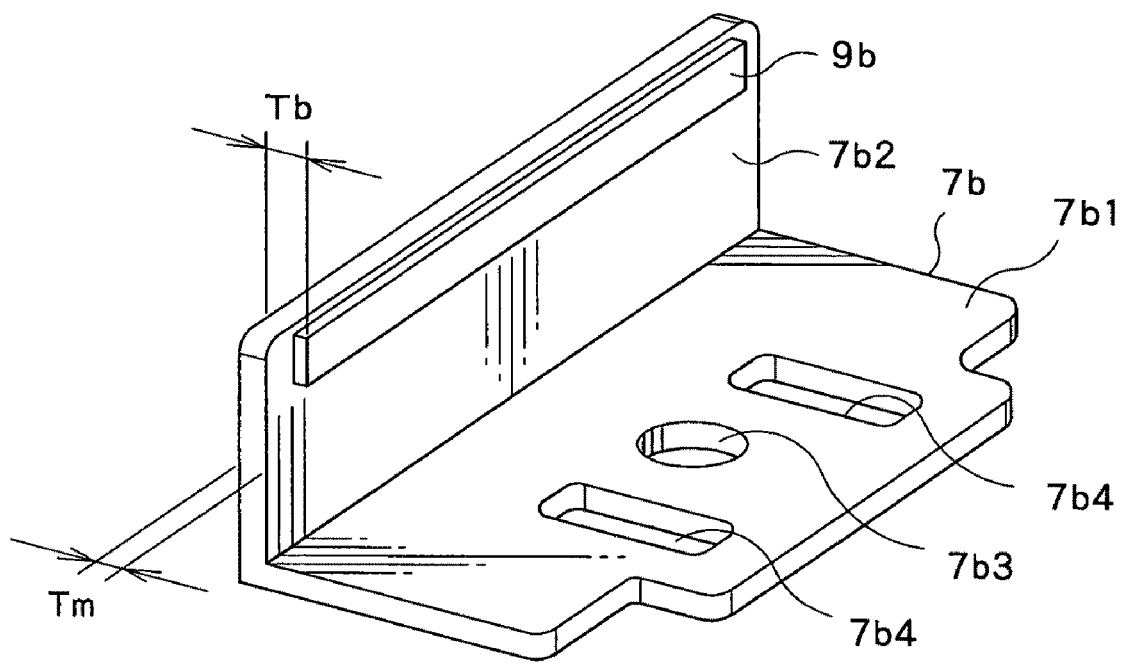
FIG. 10 is a perspective view of a lower fixing member used in assembly of the display apparatus according to the present invention.

Shown in FIG. 10 is a perspective view of each lower fixing member 7c shown in FIG. 3.

The lower fixing member 7c is made of a pressed sheet metal, having a rectangular chassis coupling member 7b1 and a panel holding member 7b2 bent at about 90 degrees from one of the longer sides of the member 7b1.

The panel holding member 7b2 is attached with a buffer member 9b at its folded inner surface that comes in contact with the display panel 5 in assembly. The buffer member 9b is attached to the holding member 7b2 so that the lower fixing member 7b is contact with the outer zone AR2 without entering the display zone AR1 when it is attached to the panel chassis 11 in FIG. 4. When the fixing member 7b is attached to the chassis 11, the buffer member 9b is contact with the display panel 5 to hold the panel 5.

A thickness Tb shown in FIG. 10 is the total of a thickness Tm of the lower fixing member 7b and that of the buffer member 9b.

Provided on the chassis coupling member 7b1 are a through hole 7b3 at the center and a pair of long holes 7a4 on both sides of the hole 7a3.

Although not shown, a mount member 11b like the mount member 11a having the protrusions 11a1 (FIG. 9) is provided on the panel chassis 11 for each lower fixing member 7b. The long holes 7b4 of the fixing member 7b are engaged with the protrusions of the mount member 11b so that the member 7b is positioned on the chassis 11 at a predetermined location.

Also not shown, provided on the panel chassis 11 in between the protrusions of the mount member 11b is a female screw 11b2. After the long holes 7b4 of the lower fixing member 7b are engaged with the protrusions of the mount member 11b, a male screw (not shown) is screwed into the female screw 11b2 via the through hole 7b3 (FIG. 10) to fix the member 7ab to the chassis 11, to unite the display panel 5 and the backlight device 6 with each other.

When the display panel 5 and the backlight device 6 are united with each other, the panel 5 is interposed between the panel holding member 7b2 (FIG. 10) of the lower fixing member 7b and the panel chassis 11 with the buffer member 9b therebetween which may be pressed in some degree. The buffer member 10 may also be pressed in some degree when it is provided, as shown in FIG. 4.

Figure 11:
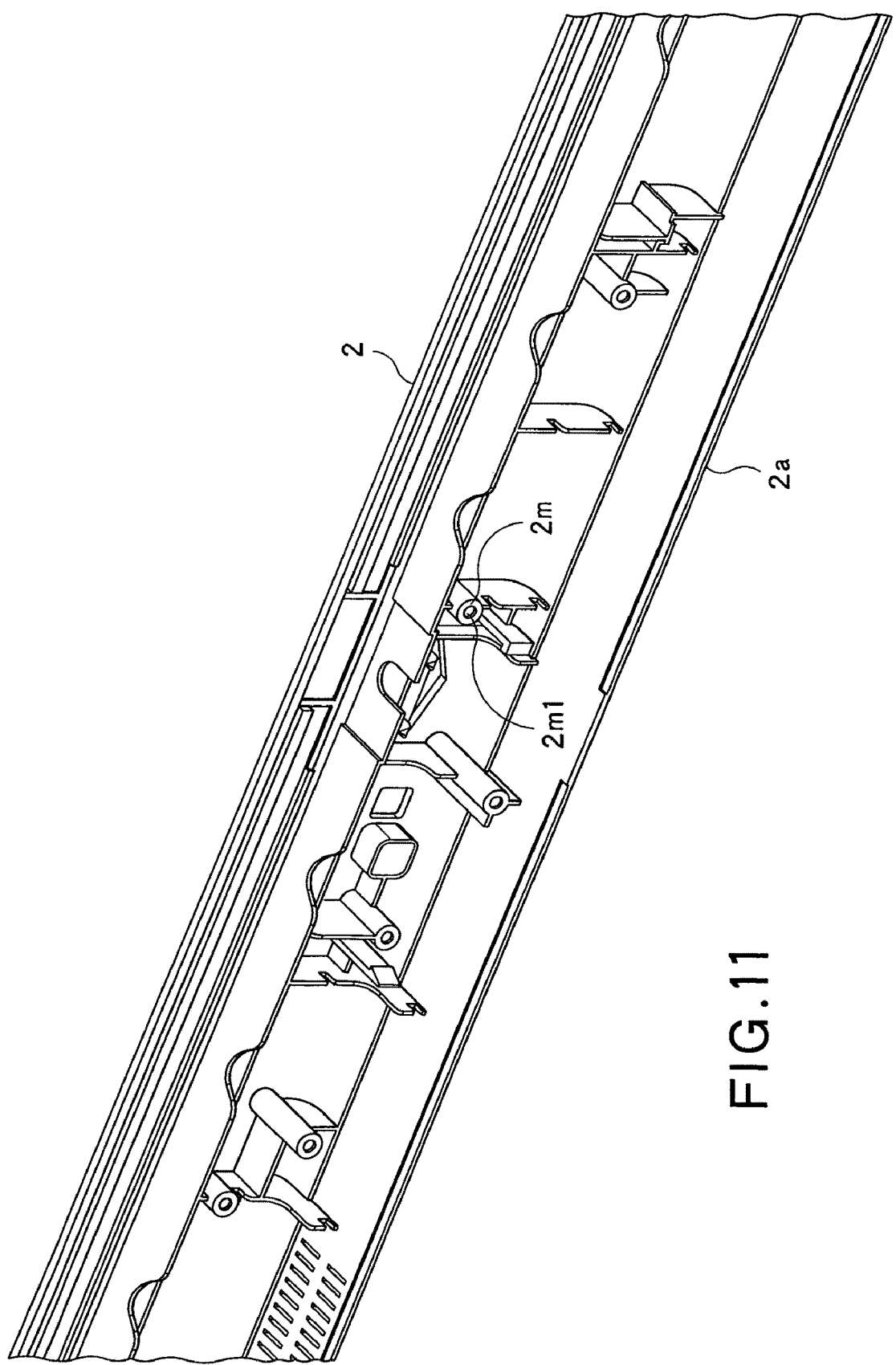
FIG. 11 is an enlarged perspective view of a lower section DT2 (a zone indicated by a dashed dotted line) of the front cover viewed in a direction Y2, as shown in FIG. 7, in the display apparatus according to the present invention.

FIG. 11 is an enlarged perspective view of a lower section DT2 (a zone indicated by a dashed dotted line) of the front cover 2 viewed in a direction Y2, as shown in FIG. 7.

In this embodiment, the display module 1 is attached to the front cover 2 with no screws to screw the lower fixing members 7b to the cover 2, at the lower side of the module 1. This is because each member 7b is not provided with a front-cover holder such as the holder 7a4 shown in FIG. 5.

For this assembly, the front cover 2 is provided with a boss having a hole 2 ml at a location where each lower fixing member 7b is attached, at the lower side of the cover 2. Although not shown, a through hole is provided to the panel chassis 11 at a position that meets the hole 2 ml when the display module 1 is attached to the cover 2. A male screw (not shown) or a self tapping screw is screwed into the through hole of the chassis 11 and the hole 2 ml of the cover 2 to unite the cover 2 and the chassis 11 with each other.

As described above in detail, the front cover 2 and the panel chassis 11 are united with each other with the fixing members 7 at the side faces, not the front face having the display zone AR1 (FIG. 4) of the display panel 5.

The upper fixing members 7a may not be provided with the front-cover holder 7a4 (FIG. 5). In the same way, the upper center fixing member 7c may not be provided with the front-cover holders 7c4 and/or the rear-cover holder 7c3 (FIG. 6). The panel chassis 11 may be provided with such front- and/or rear-cover holders. Instead, the front and/or rear covers 2 and 3 may have a configuration so that the cover can be held by the chassis 11.

As already described and as shown in FIG. 4, the buffer members 8 are provided between the front cover 2 and the display panel 5 and at specific locations on the outer zone AR2 so that the buffer members 8 do not interfere with the fixing members 7 when the panel 5 is attached.

Moreover, the buffer members 8 have the thickness Th, as shown in FIG. 8, that is different from the thicknesses of the buffer members 9a, 9b and 9c.

In this embodiment, the thickness Th of the buffer members 8 is equal to the thicknesses Ta, Tb and Tc (shown in FIGS. 5, 6 and 10, respectively). The thicknesses Ta is the total of the thickness Tm of each upper fixing member 7a and the buffer member 9a. The thicknesses Tb is the total of the thickness Tm of the each lower fixing member 7b and the buffer member 9*b*. The thicknesses Tc is the total of the thickness Tm of the upper center fixing member 7*c* and the buffer member 9*c*.

When the thickness Tm is different among the fixing member 7*a*, 7*b* and 7*c*, the buffer members 9*a*, 9*b* and 9*c* to be attached to these fixing members may be adjusted to different thicknesses to give the same total thicknesses Ta, Tb and Tc equal to the thickness Th of the buffer members 8.

The essential requirement for the buffer members 8 is that the thickness Th is larger than the thickness Tm of the fixing members 7*a*, 7*b* and 7*c* in either cases where the thickness Tm is the same for all of the members 7*a*, 7*b* and 7*c* or where it is different among these members.

It is further understood by those skilled in the art that the foregoing description is a preferred embodiment of the disclosed apparatus and that various changes and modifications may be made in the invention without departing from the sprit and scope thereof.

For example, the fixing members 7 may be provided at the left and right edge sections of the display panel 5, although the members 7 are provided on the upper and lower edge sections of the panel 5, in the embodiment.

Moreover, in the embodiment, the fixing members 7 are attached to the front cover 2 or the rear cover 3 at the side face of the display module 1 (including the upper section TD1 shown in FIG. 7 in the case of the front cover 2). Or, each fixing member 7 is attached to the side face of the display module 1, the side face being substantially perpendicular to the plane of the display panel 5 and not crossing with the plane.

However, the fixing members 7 may be attached to the front cover 2 or the rear cover 3 at the rear side of the cover, when the display-screen side of the covers 2 and 3 is defined as the front side and the opposite side is defined as the rear side.

As disclosed above in detail, the present invention provides a display-module, a support structure for the display module and a display apparatus, having a thin and lightweight display module, protected from substances such as dust from entering a backlight device and damages to a liquid crystal display panel during maintenance operations.

What is claimed is:

1. A display module comprising:
   a display panel having a display screen for displaying images on a front side of the panel, the display panel having two pairs of peripheral edge sections that constitute a frame of the display panel, the edge sections of each pair facing each other;
   a backlight device having a panel chassis provided on a rear side of the display panel with respect to the display screen; and
   a plurality of separate fixing members provided on each edge section of one of the pairs, each fixing member having a panel holder to hold the display panel by covering a portion of a periphery of the display screen and a chassis coupling member coupled to the panel chassis so that the display panel is interposed between the panel holder and the panel chassis, the display panel and the backlight device being united with each other by the fixing members.

2. The display module according to claim 1 further comprising a buffer member between the panel holder of each fixing member and the display panel.

3. The display module according to claim 2 wherein the buffer member is provided as being pressed between the panel holder and the display panel.

4. A display-module support structure comprising:
   a display panel having a display screen for displaying images on a front side of the panel, the display panel having two pairs of peripheral edge sections that constitute a frame of the display panel, the edge sections of each pair facing each other;
   a backlight device having a panel chassis provided on a rear side of the display panel with respect to the display screen;
   a plurality of separate fixing members provided on each edge section of one of the pairs, each fixing member having a panel holder to hold the display panel by covering a portion of a periphery of the display screen and a chassis coupling member coupled to the panel chassis so that the display panel is interposed between the panel holder and the panel chassis, the display panel and the backlight device being united with each other by the fixing members, thus constituting a display module;
   a front cover having an opening through which a portion of the display screen is exposed to the front side; and
   a plurality of buffer members provided on a periphery of the opening of the front cover as facing with the display module and as not interfering with the panel holder of each fixing member.

5. The display-module support structure according to claim 4 wherein each buffer member is thicker than the panel holder of each fixing member.

6. The display-module support structure according to claim 4 wherein each fixing member is attached to a side face of the display module, the side face being substantially perpendicular to a plane of the display panel and not crossing with the plane.

7. A display apparatus comprising:
   a display panel having a display screen for displaying images on a front side of the panel, the display panel having two pairs of peripheral edge sections that constitute a frame of the display panel, the edge sections of each pair facing each other;
   a backlight device having a panel chassis provided on a rear side of the display panel with respect to the display screen;
   a plurality of separate fixing members provided on each edge section of one of the pairs, each fixing member having a panel holder to hold the display panel by covering a portion of a periphery of the display screen and a chassis coupling member coupled to the panel chassis so that the display panel is interposed between the panel holder and the panel chassis, the display panel and the backlight device being united with each other by the fixing members, thus constituting a display module;
   a front cover having an opening through which a portion of the display screen is exposed to the front side;
   a rear cover to cover the display module on a rear side of the display panel, the display module being interposed between the front and rear covers; and
   a plurality of buffer members provided on a periphery of the opening of the front cover as facing with the display module and as not interfering with the panel holder of each fixing member.

* * * * *